United States Patent [19]
Custer et al.

[11] Patent Number: 5,327,814
[45] Date of Patent: Jul. 12, 1994

[54] MECHANICAL ASSEMBLIES AND METHODS OF MAKING SAME

[75] Inventors: Dennis R. Custer, West Granby; Donald J. McCarthy, Wethersfield, both of Conn.

[73] Assignee: Jacobs Brake Technology Corporation, Wilmington, Del.

[21] Appl. No.: 38,856

[22] Filed: Mar. 29, 1993

[51] Int. Cl.$^5$ ............................................. F16J 9/00
[52] U.S. Cl. ......................................... 92/248; 403/381
[58] Field of Search ............... 403/279, 281, 282, 381; 92/248

[56] References Cited

U.S. PATENT DOCUMENTS

| | | | |
|---|---|---|---|
| 4,368,634 | 1/1983 | Brown et al. | 403/381 |
| 4,706,625 | 11/1987 | Meistrick et al. | 123/321 |

FOREIGN PATENT DOCUMENTS

| | | | |
|---|---|---|---|
| 58527 | 10/1937 | Norway | 403/281 |

OTHER PUBLICATIONS

J. T. Carroll et al., "Compression Brake Master Piston Assembly: A Cost Effective Use of a Structural Ceramic to Reduce Sliding Wear in Heavy Duty Diesel Engines," SAE International, International Congress and Exposition, Detroit, Michigan, Mar. 1-5, 1993.

*Primary Examiner*—Noah Kamen
*Attorney, Agent, or Firm*—Robert R. Jackson

[57] ABSTRACT

Two members which initially have a very loose, complementary dovetail relationship to one another are firmly secured together by causing the material of a ductile locking member to flow into the space which initially exists between the complementary dovetail shapes. This technique is especially suitable for joining materials which are otherwise difficult to unite. For example, this technique can be used to secure an insert of tungsten carbide or ceramic in a main member of steel. Wear or bearing inserts of hard material can be secured in this way to the hydraulic pistons (especially the master pistons) used in compression release engine brakes.

15 Claims, 3 Drawing Sheets

MECHANICAL ASSEMBLIES AND METHODS OF MAKING SAME

BACKGROUND OF THE INVENTION

This invention relates to mechanical assemblies of initially separate parts, and to methods of making such assemblies. The invention has particular application to mechanical assemblies of the type used, for example, in compression release engine brakes. A particularly useful application of the invention is for securing hard wear and/or bearing surface members to other members. For example, such hard wear and/or bearing surface members may be needed on the hydraulic pistons (especially the master pistons) used in compression release engine brakes.

Meistrick et al. U.S. Pat. No. 4,706,625 (which is hereby incorporated by reference herein) shows a typical prior art compression release engine brake. As shown in FIG. 1 of that patent, the typical engine brake includes hydraulic circuits, each of which (when the engine brake is on) transfers the motion of one part of the associated internal combustion engine (e.g., fuel injector rocker arm 72) to another part of the engine (e.g., sliding pin 51) to open an exhaust valve 60 in a cylinder which is at or near the end of its compression stroke. This releases the gas compressed by the piston in that cylinder and prevents the energy of compression from being recovered during the subsequent expansion stroke of the cylinder. Dissipation of energy in this way helps to slow down, retard, or brake the engine and the associated vehicle.

As shown in FIG. 1 of the U.S. Pat. No. 4,706,625, each hydraulic circuit in an engine brake typically includes a master piston 66 and a slave piston 50. In the particular engine brake shown in U.S. Pat. No. 4,706,625 FIG. 1, adjusting screw 70 on rocker arm 72 bears on the lower surface of master piston 60 when the engine brake is on so that master piston 60 is driven to reciprocate by the arcuate reciprocation of the adjusting screw. The area of contact between adjusting screw 70 and master piston 66 is one of the highest stress regions in the engine brake. The top of the adjusting screw may be convex to avoid an edge of the screw contacting the master piston when the adjusting screw rocks due to oscillation of rocker arm 72. This convexity reduces the area of contact between the adjusting screw and the master piston, thereby contributing to the high stress in the contact area. The arcuate motion of adjusting screw 70 also causes the top of the screw to slide back and forth on the master piston surface it contacts, thereby increasing the tendency of the contacting surfaces to wear. To reduce this wear it has been necessary to ensure good lubrication between the master piston and the engine component such as adjusting screw 70 which contacts it. It has also been known to weld a layer of tungsten carbide—which is a very hard material—to the wear surface of the master piston. For example, such a welded tungsten carbide layer may be 0.014 to 0.015 inches thick.

Engine performance is constantly being pushed to higher levels. Increased engine performance leads to even higher stress on the master piston in an associated engine brake. This may cause the above-mentioned tungsten carbide layer to crack. Engine manufacturers are also now interested in so-called "dry engines." These are engines employing much less lubricant than has been traditionally employed. Reduced lubricant reduces the horsepower required for lubricant pumping, and also reduces the amount of combusted lubricant (and therefore pollutants) in the engine exhaust. From the standpoint of engine brake manufacture, however, a dry engine is an even more severe operating condition because there is less lubricant available for lubricating the engine brake master piston surfaces which receive the driving inputs from the associated engine.

Thicker layers of tungsten carbide on master pistons have been considered, but tungsten carbide is extremely difficult to weld and it has not proven practical to deposit tungsten carbide layers thicker than about 0.014 to 0.015 inches as mentioned above. Substitution of a ceramic such as silicon nitride ($Si_3N_4$) for the tungsten carbide on master pistons has also been considered. This would be advantageous because silicon nitride has a modulus of elasticity close to that of the bearing steel (e.g., so-called 52100 bearing steel) typically used for parts such as the adjusting screw 70 which contact the master piston. However, silicon nitride has a coefficient of thermal expansion which is much less (e.g., only about one-sixth) the coefficient of thermal expansion of the steel used to make master pistons. This makes secure attachment of a ceramic element to a master piston difficult, especially in view of the fact that the ceramic element would typically be on the lower surface of the associated master piston, where it would be out of contact with any part of the engine when the engine brake is off.

In view of the foregoing, it is an object of this invention to facilitate the assembly of parts with somewhat incompatible properties, or to facilitate the assembly of relatively small, complex, or intricate parts generally.

It is another object of this invention to facilitate the provision of mechanical assemblies with hardened wear or bearing surfaces of materials such as tungsten carbide or ceramic such as silicon nitride.

It is still another object of this invention to facilitate the provision of engine brake pistons (especially master pistons) with hardened wear or bearing surfaces of materials such as tungsten carbide or ceramic such as silicon nitride.

It is yet another object of this invention to provide engine brake pistons (especially master pistons) with securely attached inserts of materials such as tungsten carbide or ceramic such as silicon nitride for use as wear or bearing surfaces.

SUMMARY OF THE INVENTION

These and other objects of the invention are accomplished in accordance with the principles of the invention by providing two members to be joined (e.g., an engine brake piston and a wear or bearing insert of a material such as tungsten carbide, hardened tool steel, or ceramic such as silicon nitride) with loose, complementary, dovetail-shaped portions. The complementary dovetail-shaped portions are loose enough so that they fit together easily and leave a substantial space between the surfaces which define the complementary dovetail shapes. A locking member of a ductile material such as copper, aluminum, or zinc is positioned adjacent the above-mentioned space. Material of the locking member is then forced to flow into the above-mentioned space in order to substantially fill that space and produce a tight dovetail connection between the two principal members.

Further features of the invention, its nature and various advantages will be more apparent from the accompanying drawings and the following detailed description of the preferred embodiments.

DETAILED DESCRIPTION OF THE PREFERRED EMBODIMENTS

Although, as has been mentioned, the invention has many other possible uses and applications, the invention will be fully understood from the following explanation of its application to various compression release engine brake components such as master pistons for the hydraulic circuits in compression release engine brakes.

Figure 1:
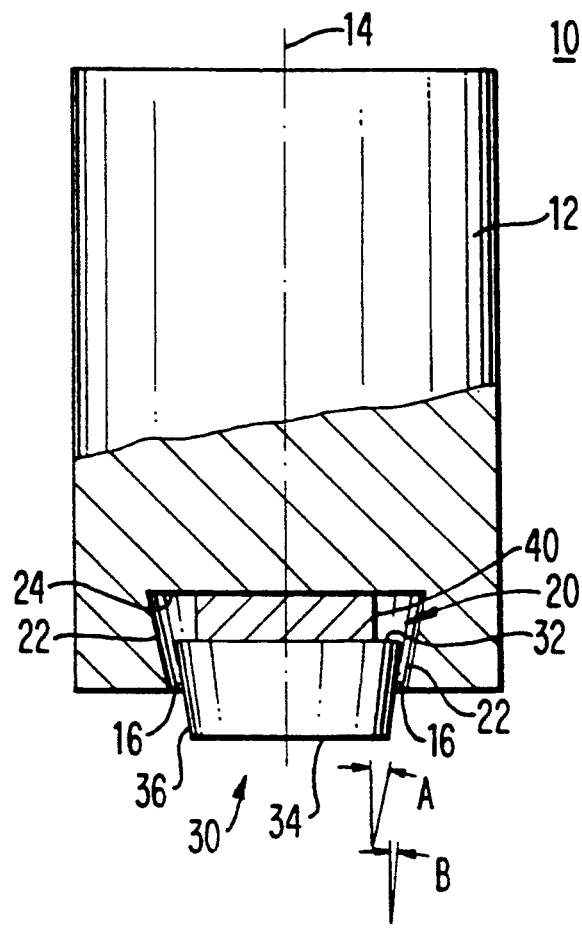
FIG. 1 is a simplified elevational view, partly in section, of a first illustrative embodiment of the invention prior to completion of assembly in accordance with the invention.
Figure 2:
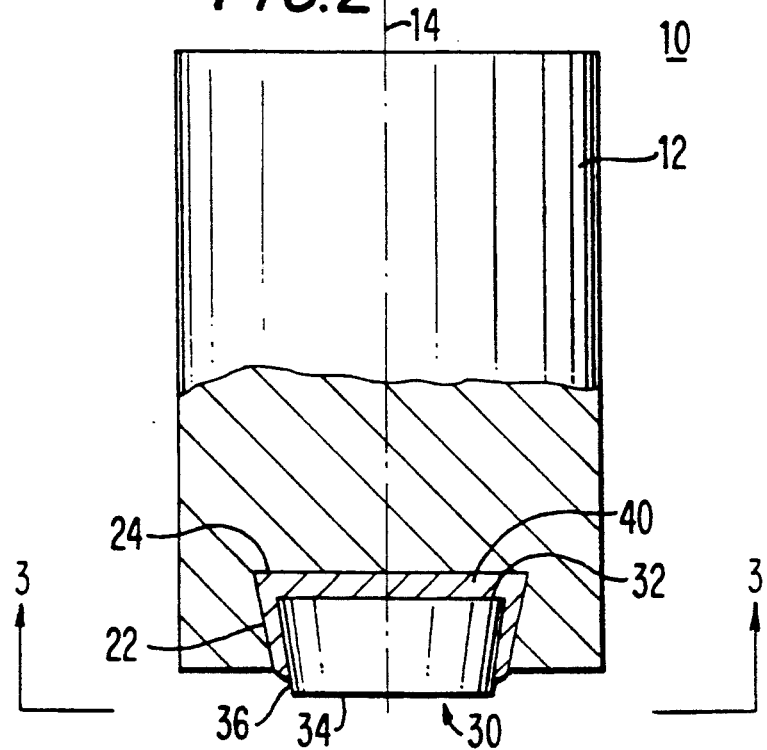
FIG. 2 is a view similar to FIG. 1 showing the apparatus of FIG. 1 after final assembly in accordance with the invention.
Figure 3:
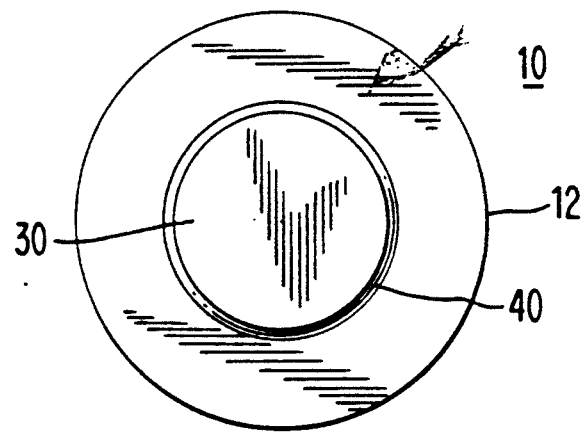
FIG. 3 is a view taken along the line 3—3 in FIG. 2.

As shown in FIGS. 1-3 a compression release engine brake master piston 10 constructed in accordance with this invention includes a substantially cylindrical main body member 12 which is typically made of steel. The central longitudinal axis of main body 12 is indicated by reference number 14. A recess 20 is formed in the center of the lower surface of main body 12. Recess 20 is frustoconical in shape. The central axis of this frustoconical recess is coincident with axis 14. The smaller end of frustoconical recess 20 is adjacent the lower surface of main body 12. The larger end of frustoconical recess 20 is in the interior of main body 12. The angle of inclination of the side surface 22 of frustoconical recess 20 is the angle A in FIG. 1. The "bottom" surface of recess 20 is identified by reference number 24.

The other principal component of master piston 10 is a frustoconical insert 30 in recess 20. Insert 30 is typically made of a hard material such as tungsten carbide, hardened tool steel, or a ceramic material such as silicon nitride which is difficult to secure to main body 12 in the absence of this invention. The central axis of frustoconical insert 30 is also coincident with axis 14. The larger end 32 of insert 30 is inside recess 20. The smaller end 34 of insert 30 projects somewhat from recess 20. The side surface of insert 30 is identified by reference number 36. The angle of inclination of side surface 36 is the angle B in FIG. 1. Angle B is depicted as less than angle A, although this is entirely optional.

The larger end of insert 30 is smaller than the smaller end of recess 20. This allows insert 30 to be inserted into recess 20 along axis 14. It also leaves an annular space 16 between the side surface 36 of insert 30 and the side surface 22 of recess 20 when insert 30 is in recess 20.

Because both recess 20 and insert 30 are frustoconical, and because insert 30 is significantly smaller than recess 20, there is initially a loose dovetail relationship between insert 30 and recess 20. FIG. 1, for example, depicts this loose dovetail relationship. In this particular embodiment of the invention the dovetail relationship is annular because surfaces 22 and 36 are both surfaces of revolution about axis 14. A short cylindrical member 40 of a ductile material such as copper, aluminum, or zinc is placed between insert surface 32 and recess surface 24. The material of member 40 is used to secure insert 30 in recess 20 as will now be described.

When the three components of master piston 10 have been assembled as shown in FIG. 1, main body 12 and insert 30 are forced toward one another parallel to axis 14. This causes the ductile material of member 40 to flow. At first the material of member 40 flows radially outward toward the side surface 22 of recess 20. When the compressing space between surfaces 32 and 24 is completely filled, the material of member 40 begins to flow into the annular space 16 between surfaces 22 and 36. The forcing of main body 12 and insert 30 toward one another is stopped when (as shown in FIG. 2) the material of member 40 substantially fills annular space 16. When annular space 16 is thus substantially filled with the material of member 40, that material holds insert 30 firmly in place in recess 20.

Figure 4:
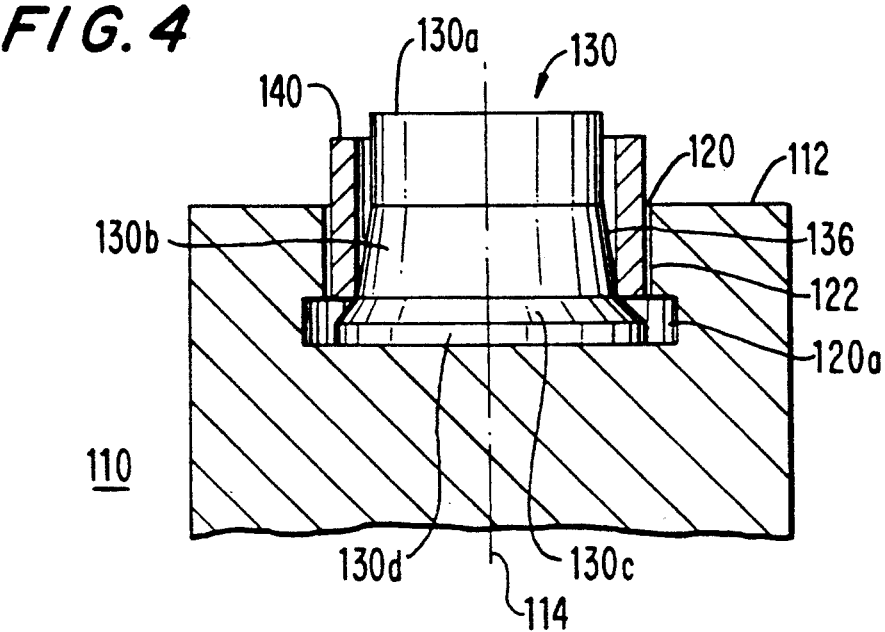
FIG. 4 is a simplified sectional view of a second illustrative embodiment of the invention prior to completion of assembly in accordance with the invention.
Figure 5:
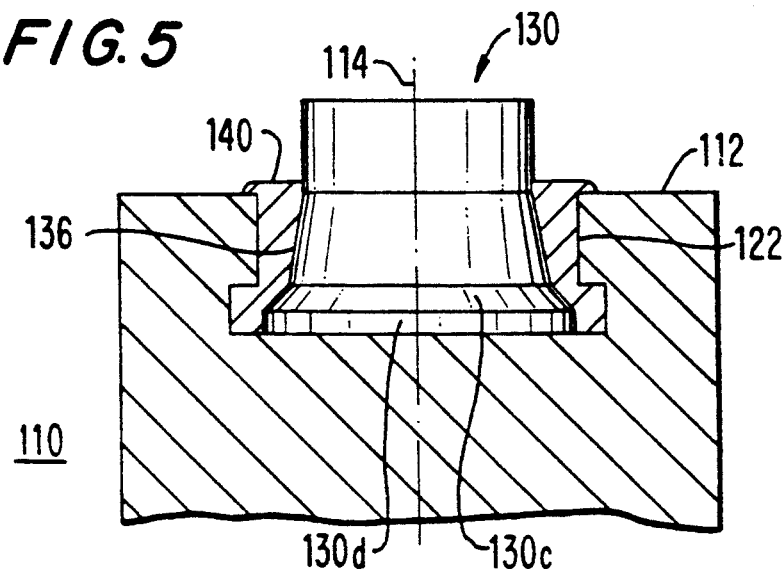
FIG. 5 is a view similar to FIG. 4 showing the apparatus of FIG. 4 after final assembly in accordance with the invention.

FIGS. 4 and 5 show an alternative embodiment 110 of the invention in which the equivalent of ductile member 40 is not initially positioned in the bottom of the recess. In this embodiment main body 112 (e.g., of steel) has a substantial cylindrical recess 120 which is radially enlarged near the "bottom" (i.e., at 120a). Insert 130 (e.g., of a hard material such as tungsten carbide, hardened tool steel, or a ceramic such as silicon nitride) has two substantially cylindrical portions 130a and 130d, and two intervening frustoconical portions 130b and 130c. Frustoconical portion 130b flares out slightly from portion 130a in the direction of portion 130d, and frustoconical portion 130c flares out even more from portion 130b in the direction of portion 130d. The largest part 130d of insert 130 is slightly smaller than the smaller part of recess 120 so that insert 130 can be readily placed in recess 120 along axis 114. When insert 130 is thus seated in recess 120, the largest part 130d of insert 130 is adjacent the largest part 120a of recess 120. A substantial annular space is left between the side surface 122 of recess 120 and the side surface 136 of insert 130.

In order to hold insert 130 in recess 120, a short annular or substantially annular member 140 (e.g., of a ductile material such as copper, aluminum, or zinc) is placed around insert 130 as shown in FIG. 4 so that it partly extends into the annular space between surfaces 122 and 136. Member 140 is then forced farther into this annular space substantially parallel to axis 114. The application of this force to member 140 causes the material of member 140 to flow down into the enlarged portion 120a of recess 120 and therefore around enlarged parts 130c and 130d of insert 130 as shown in FIG. 5. In this condition the material of member 140 locks insert 130 firmly into place in recess 120.

As in the first embodiment shown in FIGS. 1-3, in the embodiment shown in FIGS. 4 and 5 the principal parts 112 and 130 initially have a loose, complementary, dovetail relationship. The space between the structures providing this dovetail relationship (i.e., structure 120a in main body 112, and structures 130c and 130d on insert 130) is then filled by forcing a ductile material 140 into that space.

Figure 6:
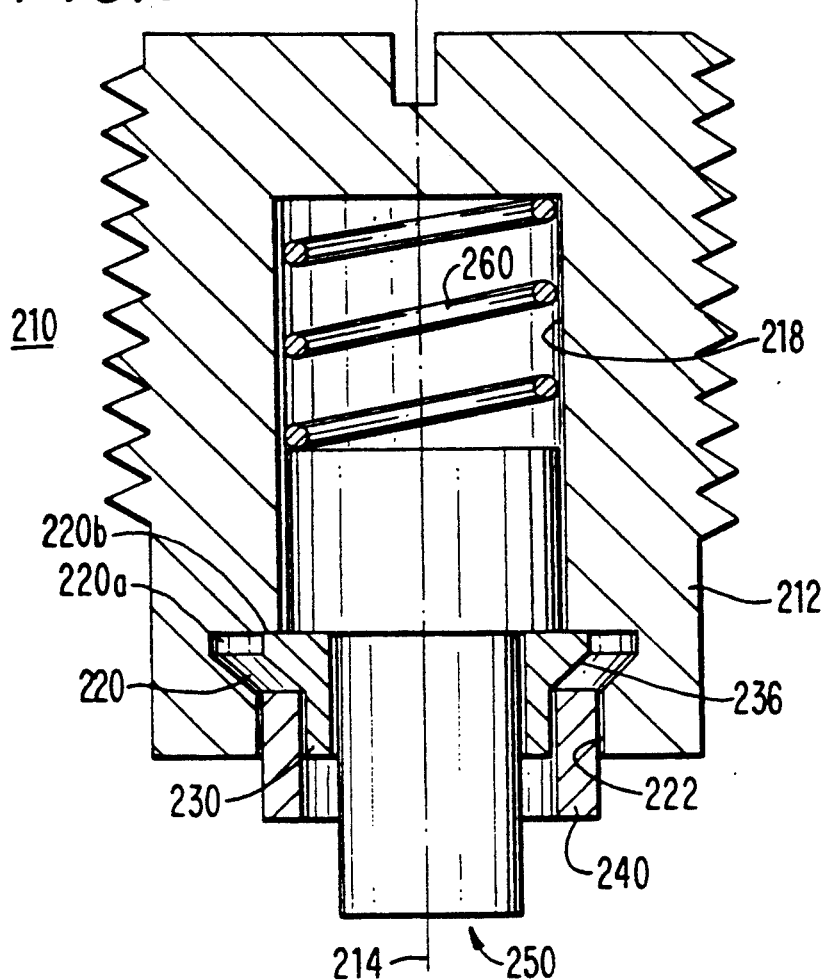
FIG. 6 is a simplified sectional view of a third illustrative embodiment of the invention prior to completion of assembly in accordance with the invention.
Figure 7:
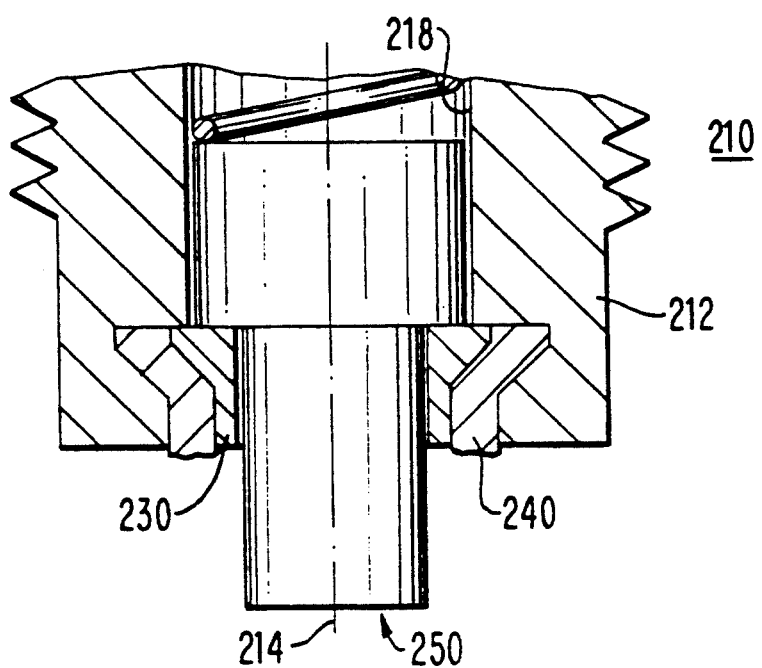
FIG. 7 is a view similar to FIG. 6 showing the apparatus of FIG. 6 after final assembly in accordance with the invention.

While the principles of this invention are particularly suited to joining two (or more) members of materials that would otherwise be difficult to join (e.g., a steel body such as piston 12 or 112 and an insert 30 or 130 of a hard material such as tungsten carbide or silicon nitride), the invention is also useful to facilitate assembly of complex and/or intricate parts. For example, FIGS. 6 and 7 illustrate application of the invention to holding a reciprocating plunger 250 captive in a surrounding main body 212. Assemblies 210 of the general type shown in FIGS. 6 and 7 may be used, for example, as automatic lash adjusting mechanisms in compression release engine brake slave pistons (e.g., as in Custer U.S. Pat. No. 4,398,510), as clip valves in such brakes (e.g., as in Hu U.S. Pat. No. 5,161,501), as reset mechanisms in such brakes (e.g., as in Cavanagh U.S. Pat. No. 4,399,787), or as safety valves in such brakes (e.g., as in Lass U.S. Pat. No. 3,405,699).

Main body 212 of assembly 210 has a bore 218 for receiving reciprocating plunger 250. A prestressed compression coil spring 260 is disposed in bore 218 for resiliently urging plunger 250 outwardly of bore 218 parallel to axis 214. The outermost portion 220 of bore 218 is radially enlarged and shaped very much like recess 120 in FIGS. 4 and 5. In particular, recess 220 has an initial substantially cylindrical portion, and a radially further enlarged "bottom" portion 220a. A retainer ring 230 fits around the portion of plunger 250 which is of smaller diameter. Retainer ring 230 can be inserted into recess 220 parallel to axis 214 until the retainer ring seats against the shoulder 220b which forms the transition between enlarged recess portion 220a and the main portion of bore 218. Retainer ring 230 flares out adjacent to recess portion 220a so that retainer ring 230 and main body 212 have a loose dovetail relationship to one another.

Annular or substantially annular member 240 of a ductile material such as copper, aluminum, or zinc is inserted into an initial portion of the annular space between the side surface 236 of retainer ring 230 and the side surface 222 of main body 212 as shown in FIG. 6. Then member 240 is forced farther into this annular space so that the material of member 240 flows into the enlarged portion 220a of recess 220 and therefore around the enlarged portion of retainer ring 230 as shown in FIG. 7. In this condition member 240 locks retainer ring 230 in place in recess 220. Retainer ring 230 in turn limits the outward travel of plunger 250 in bore 218.

It will be understood that the foregoing is merely illustrative of the principles of this invention, and that various modifications can be made by those skilled in the art without departing from the scope and spirit of the invention. For example, the particular shapes of the portions of the principal members which define the space into which the ductile member is initially placed and later farther forced can vary considerably. Similarly, the space into which the ductile member is forced need not be annular as shown and described above. As an alternative to an annular space, the ductile member could be forced into a longitudinal space between the two principal members.

What is claimed is:

1. A substantially rigid assembly comprising:
   first and second members, said first member having a male dovetail-shaped portion positioned in a female dovetail-shaped portion of said second member leaving substantial space between adjacent surfaces of said portion which define the dovetail shapes of said portions; and
   a locking member of ductile material filling said space; wherein
   said first member has a first end positioned within said female dovetail-shaped portion of said second member and a second end outside said female dovetail-shaped portion and extending beyond the walls of said locking member; and
   said locking member is formed by initially positioning said ductile material adjacent to said space and subsequently forcing said ductile material to at least partly flow into said space in order to substantially fill said space and provide a tight dovetail connection between said surfaces of said portions which define the dovetail shapes of said portions of said first and second members, leaving said second end of said first member exposed as a contact surface for contact with elements external to said assembly.

2. The assembly defined in claim 1 wherein said male and female portions have a common longitudinal axis, and wherein each of said portions is annular about said longitudinal axis.

3. The assembly defined in claim 1 wherein said male and female portions have a common longitudinal axis, and wherein the surface of each of said portions which defines the dovetail shape of said portion is a surface of revolution about said longitudinal axis.

4. The assembly defined in claim 1 wherein said first and second members are made of different materials.

5. The assembly defined in claim 4 wherein one of said members is made of steel, and wherein the other of said members is made of a material selected from the group consisting of tungsten carbide, hardened tool steel, and ceramic.

6. The assembly defined in claim 1 wherein said locking member is made of a material selected from the group consisting of copper, aluminum, and zinc.

7. The assembly defined in claim 1 wherein said locking member is formed by initially disposing said ductile material in a gap communicating with said space and located between said female portion and said first end of said male portion, and subsequently causing said ductile material of said locking member to flow from aid gap into said space by forcing said first ends of said male portion toward said female portion.

8. The assembly defined in claim 1 wherein:
   said male and female portions have a common longitudinal axis;
   said first member has first side surfaces leading to said male dovetail-shaped portion which are substantially parallel to said longitudinal axis;
   said second member has second side surfaces leading to said female dovetail-shaped portion;
   said first and second surfaces are adjacent to but spaced from one another to define a gap leading to said space; and
   said locking member is formed by initially disposing said ductile material in said gap, and subsequently causing said ductile material to flow from said gap into said space by pushing on said ductile material in a direction from said gap toward said space.

9. The assembly defined in claim 1 wherein said second member is a hydraulic piston for use in an engine brake, and wherein said first member is an insert in an end of said second member for transmitting mechanical force between said second member and a component of an internal combustion engine associated with said engine brake.

10. The assembly defined in claim 9 wherein said second member is a master piston in said engine brake, and wherein said first member transmits force from said component to said second member.

11. A substantially rigid assembly comprising:

first and second members, said first member having a male dovetail-shaped portion positioned in a female dovetail-shaped portion of said second member with substantial space between adjacent surfaces of said portions which define the dovetail shapes of said portions; and a locking member of ductile material filling said space; wherein:

said first member is a retainer member disposed in a recess in said second member; and said locking member is formed by initially positioning said ductile material adjacent to said space, and subsequently forcing said ductile material to at least partly flow into said space in order to substantially fill said space and provide a tight dovetail connection between said surfaces of said portions which define the dovetail shapes of said portions of said first and second members; said assembly further comprising:

a third member disposed in said recess and extending beyond the walls of said first and second members and said locking member, said third member being retained in said recess by said retainer member.

12. The assembly defined in claim 11 wherein said third member is reciprocable in said recess, and wherein said assembly further comprises:

means for resiliently urging said third member to move in a direction which is outward of said recess.

13. The assembly defined in claim 12 wherein motion of said third member outwardly of said recess is stopped by contact between said third member and said retainer member.

14. The assembly defined in 11 wherein said retainer member is a hollow annulus, and wherein said third member projects through the hollow center of said annulus.

15. A substantially rigid assembly comprising:

first and second members, said first member having a male dovetail-shaped portion positioned in a female dovetail-shaped portion of said second member leaving substantial space between adjacent surfaces of said portions which define the dovetail shapes of said portions; and a locking member of ductile material filling said space; wherein:

said female dovetail-shaped portion of said second member has a bottom surface;

said first member has a first end positioned within said female dovetail-shaped portion of said second member and opposite said bottom surface; and said locking member is formed by initially disposing said ductile material in a gap communicating with said space and located between said bottom surface of said female portion and said first end of said male portion, and subsequently forcing said first end of said male portion toward said female portion to thereby cause said ductile material of said locking member to flow from said gap into said space in order to substantially fill said space and provide a tight dovetail connection between said surfaces of said portions which define the dovetail shapes of said portions of said first and second members.

* * * * *